United States Patent Office 3,062,561
Patented Nov. 6, 1962

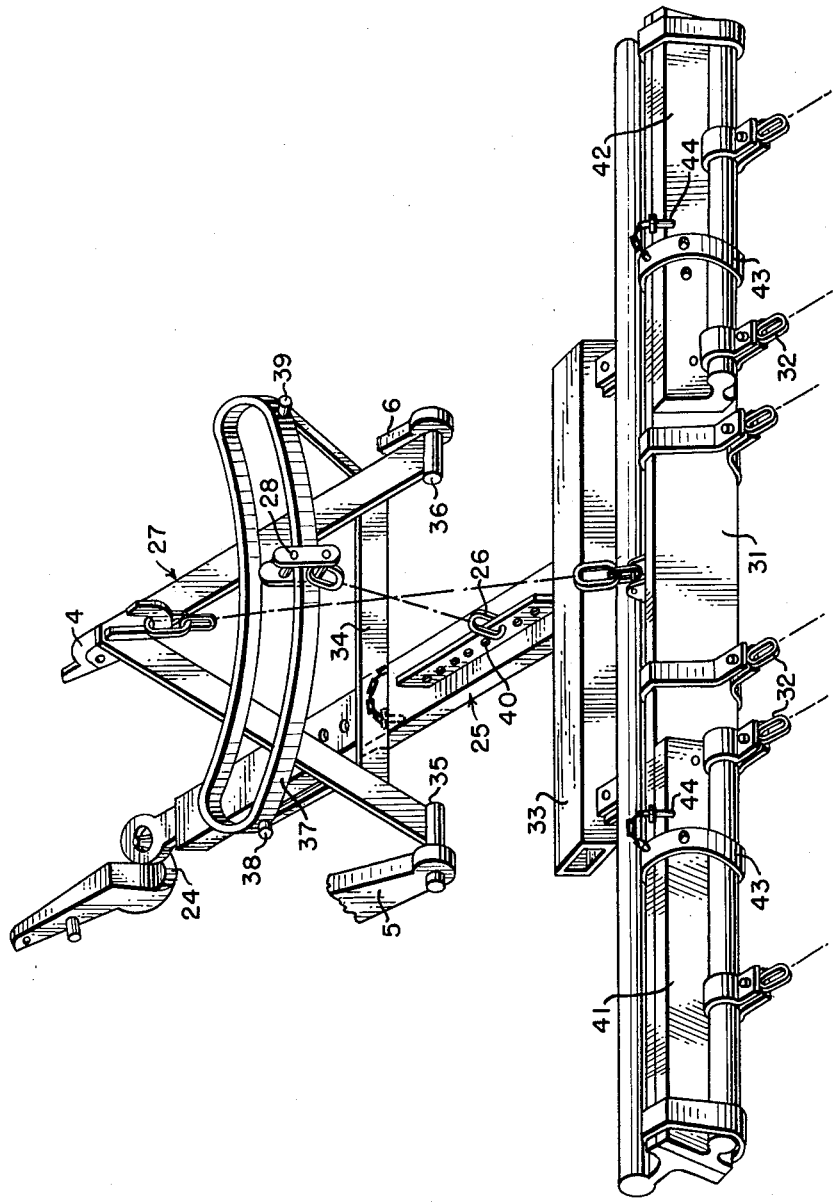

3,062,561
DEVICE FOR ATTACHING TRAILED VEHICLES OR IMPLEMENTS TO A TRACTOR
Sigurd Wulff, Vadsbro, Ragnar Henningsson, Vingaker, and Lennart Cassler, Nykoping, Sweden, assignors to Aktiebolaget Farming, Nykoping, Sweden, a corporation of Sweden
Filed Nov. 20, 1959, Ser. No. 854,461
Claims priority, application Sweden Nov. 21, 1958
12 Claims. (Cl. 280—405)

This invention relates to a device for attaching trailed vehicles or implements to a tractor equipped with a hitch for implements, which consists of upper and lower links and in which one of the links, e.g. the upper link, is adapted, via a double-acting spring or like auxiliary means, to resist either compression or tension forces arising from the draft soil force on the implement for automatically maintaining said force as pre-set by the operator. The said hitch is designed in such a way that it tends to maintain the compressive or tensile load on said link, and it is thus caused to change the position into which it has been set when the compressive or tensile load thereon changes. The hitch consequently is equipped with a draft control system such as is outlined for instance in the Chambers United States Patent No. 2,437,875, issued March 16, 1948 and described more in detail in the following.

The device according to the invention is so constructed as to permit transferring weight from the trailer vehicle or implement to the tractor to avoid slipping of the tractor drive wheels on the ground. Moreover, the device according to the invention is of such a nature that the tractor hitch is subjected to a load dependent on the size of the transferred weight so that the height of the hitch over the ground is maintained constant irrespective of whether the tractor changes its position of inclination or position of height relative to the trailed vehicle or implement. By this arrangement the transferred weight will be constant and thus independent of whether the tractor changes position relative to the trailed vehicle or implement, so that an extremely smooth and efficient operation is obtained even though the tractor is of relatively low weight compared to the trailed vehicle or implement.

Further features of the invention and the advantages gained thereby will become apparent from the following description, reference being made to the accompanying drawing which illustrate some embodiments, chosen by way of example, of the device according to the invention.

In the drawings:

FIG. 1 shows a side elevational view of a first embodiment of the device for attaching a trailed vehicle to a tractor, the draft control system being schematically shown;

FIGS. 2 to 4 schematically show said device for attaching a trailed vehicle to a tractor, in three different positions;

FIG. 6 shows a perspective view, on a larger scale, of a third practical embodiment of the device shown in FIGS. 1 to 4.

Figure 1:
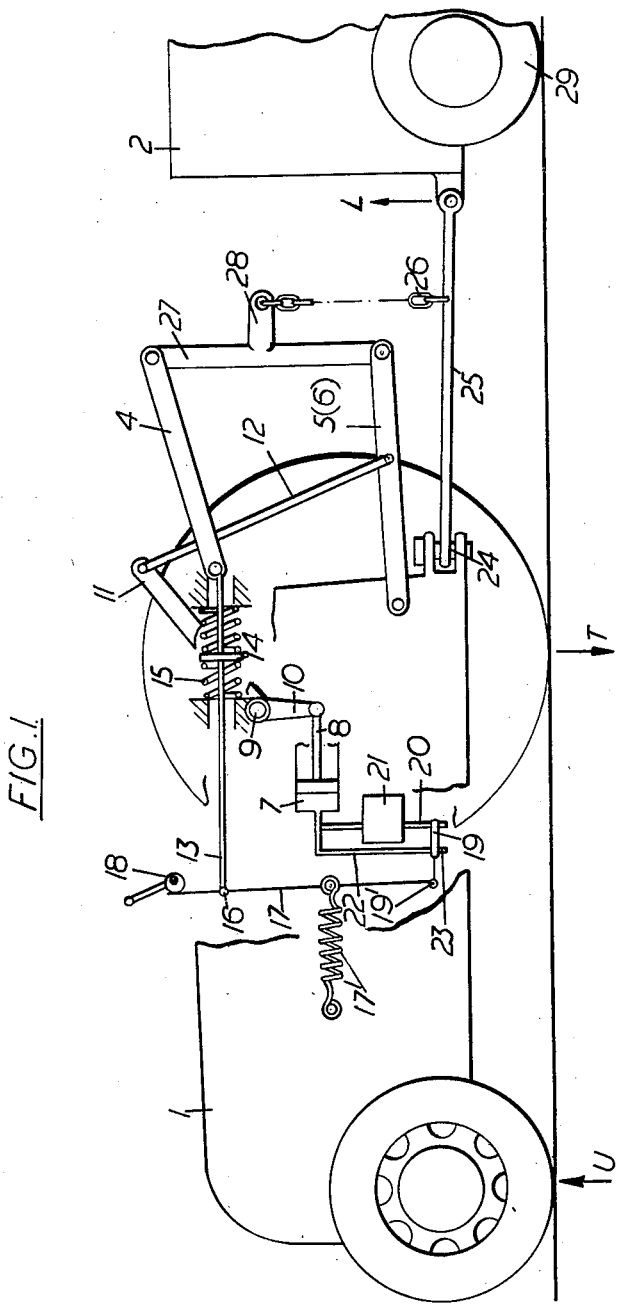

With reference to the drawings, 1 denotes the tractor, 2 the trailed appliance, herein shown as a wheeled vehicle, for instance a two-axle vehicle, and 3 the trailed implement, for instance a harrow.

The tractor has the hydraulically operated hitch which consists of an upper link 4 and two lower laterally spaced draft links 5 and 6 which can be raised, lowered and supported by the cylinder-piston arrangement 7 acting through the rod 8, shaft 9, bell crank lever 10, 11 and link 12.

As will appear from FIG. 1, the automatic control intended for the usual fully mounted agricultural implements which are attached to and fully supported by the three links 4 to 6, is essentially of the following nature. A rod 13 attached to the upper link 4 has a flange 14 acting against balance spring means 15 which tends to resist inward or outward movement of the upper link 4. The rod 13 is pivoted at 16 to a floating lever 17. At its upper end the lever 17 is fulcrumed upon by a handle-controlled eccentric 18 and at its lower end it is pivotally connected as by a pin 19' to a valve 19 shown in neutral or mid-position. The valve 19 controls the inlet 20 to the pump 21 which supplies oil to the cylinder-piston arragnement 7. The valve also controls the outlet passage 22 from the cylinder-piston arrangement 7. In the position shown in FIG. 1 the valve 19 blocks the cylinder-piston arrangement 7 and the pump 9, and the trailed implement is supported on the links 4 to 6 with weight transfer to the tractor 1. A spring 17' connected between the lever 17 and a stationary part of the tractor body urges the lever clockwise about the pivot 16 to maintain its upper end in engagement with the eccentric 18. Any change in the position of the eccentric or in the position of the pivot 16 is reflected by pivotal movement of the lever to shift the valve 19 in a direction to raise or lower the hitch as the case may be.

The mode of operation of a control system of the type shown is well-known. Thus, if the eccentric 18 is rotated in a direction to cause the lever 17 to swing anti-clockwise around the pivot 16 it moves the valve 19 to the right to open exhaust passage 23. The hitch linkage and implement attached to it is lowered to the ground. The resistance opposed to forward movement of the implement acts in well-known manner to apply a compressive force through the top link 4 to the spring 14 and the rod 13 is moved inwardly of the tractor. This inward movement of the rod shifts the pivot 16 of the lever 17 to the left as viewed in FIG. 1 and the spring 17' becomes effective to rock the lever 17 clock-wise around the eccentric 14 and move the valve 19 back to the left until it is again in neutral position and holds the implement. Thus the horizontal draft force resulting from implement reaction against the soil, is proportional to the displacement of the eccentric 18.

If the draft force increases, the pivot 16 of the lever 17 is shifted farther and the valve 19 is moved to the left opening the pump inlet 20 so that the pump 21 supplies oil to raise the hitch linkage. Upon the reduction of the draft force, the valve 19 is moved back to the right to neutral position. If draft force decreases still farther, the valve 19 is moved to the right sufficiently to open the outlet 22 to lower the hitch linkage. Such adjustments are continued to maintain a substantially uniform draft load on the hitch linkage determined by the displacement of the eccentric 18.

The spring 15 is double-acting, that is it will resist compression or tension in the upper link 4. The link 4 will be in tension with a mounted implement of which the weight creates a clockwise moment around the rear end of the lower links 5 and 6 which is greater than the anti-clockwise moment created by the horizontal draft force. It will thus be seen that the automatic control action is the same whether the resultant force in the upper link 4 is compressive or tensile.

For coupling an implement such as a wheeled vehicle 2 to the tractor, drawbar 25 is secured to the vehicle 2 and hitched to a drawhook or like member 24 preferably mounted beneath the rear wheel axle of the tractor 1. The connection is such that the tractor 1 and the vehicle 2 can move relative to one another in the vertical plane extending through them. Of course, they shall also be able to swing relative to each other in the horizontal plane.

A chain 26, link or the like is attached at a suitable point to the drawbar 25 and coupled to the hitch consisting of the links 4 to 6 which have their ends remote from the tractor so interconnected that they will move as a unit. As will appear from FIG. 6, the interconnection means 27 is a triangle and the fixation point 28 for the chain 26 is so selected that a suitable load is obtained on the link 4. According to the invention, the load on the spring 15 is exploited.

If the eccentric 18 is rotated to move the valve 19 to the left the power lift will try to lift the links 5 and 6 and a lifting force will be exerted on the drawbar 25 through the means 27 and the chain 26. At the same time this will create a clockwise moment on the means 27 which will act through the upper link 4 to return the valve 19 to neutral position. Thus a predetermined lifting force L can be attained which is proportional to the rotation of the eccentric 18. This force in effect transfers weight from the vehicle 2 to the tractor rear wheels and produces an additional force T. It also increases the additional force T because some tractor weight U is transferred from the tractor front wheels to the rear wheels.

This weight transfer is automatically kept substantially constant on uneven ground in the same way as already described with reference to draft control. Thus, if the tractor dips forwardly at the front it will tend to lift the drawbar 25 and increase the force L but this will move the valve 19 to drop position. Similarly the valve 19 will move to lift position if the tractor rises at the front, which results in a reduction of the force L. Stated in another way, the drawbar 25 will be kept at substantially the same height from the ground and allow free articulation between the tractor 1 and the vehicle 2 while transferring weight.

Figure 2:
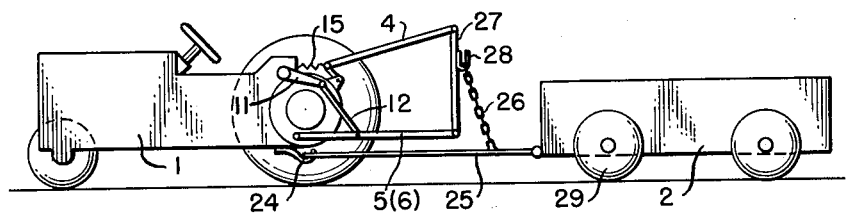

As will appear from FIG. 2, the chain 26 is slack and does not therefore transfer any weight from the vehicle 2 to the tractor 1. Neither is there obtained any automatic adjustment by means of the hitch, and the drawbar 25 thus functions in this position as a conventional drawbar.

Figure 3:
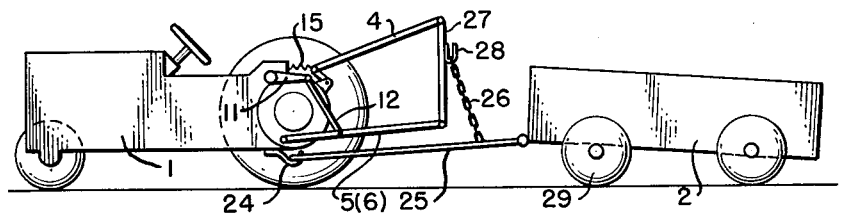
Figure 4:
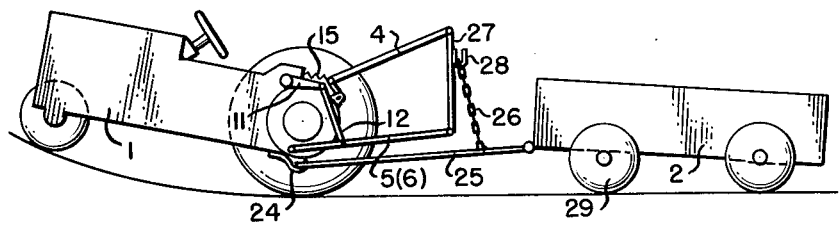

According to FIG. 3, the chain 26 is tensioned and therefore transfers some of the weight of the vehicle 2 to the tractor 1. The transferred weight is so selected that the front wheels 29 of the vehicle 2 are not entirely relieved of load. As a reseult, a greater or smaller weight can be transferred depending on how high the end of the vehicle 2 connected to the drawbar 25 is over the ground. Thus it is this variation of weight that ensures that the front end of the vehicle 2 is at a constant distance from the ground irrespective of the position of the tractor, as will be understood from FIG. 4. The variation of the transferred weight is only momentary, as it is this variation that ensures that the transferred weight is in principle constant.

Figure 5:
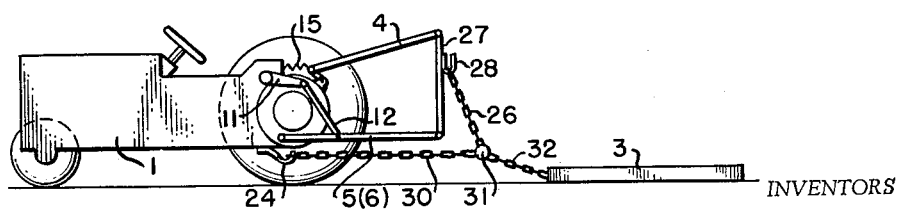
FIG. 5 shows a schematical side elevational view of a second embodiment of the device for attaching a trailed implement such as a harrow, to a tractor, said device being shown in a position corresponding to FIG. 3.

The embodiment shown in FIG. 5 differs from that according to FIGS. 1 to 4 only in that a pair of chains 30 extending at an angle from the hook 24 has been substituted for the drawbar 25. The said chains 30 are secured to a heavy beam 31 which may be of the nature shown in FIG. 9. The chain 26 is attached to the beam 31 intermediate the ends thereof. Besides, a number of chains 32 are mounted on the beam 31 for the connection of the harrow 3 to said beam.

As will appear from FIG. 6 the drawbar 25 is in the shape of a T, the crosspiece 33 thereof being intended for connection to the trailed vehicle. To obtain an additional load on the tractor upon drawing particularly of lightweight implements of low soil draft force, a heavy beam 31 may be arranged adjacent the crosspiece 33. Owing to its T-shape the drawbar 25 permits the largest possible swinging movements of the tractor 1 in relation to the trailed vehicle 2 or the implement 3.

Disposed at some distance above the drawbar 25 is the base 34 of the triangle 27. Said base 34 serves as a protection against the tractor tilting over. Thus, should the tractor tend to tilt over, the drawbar 25 hits the base 34 of the triangle 27. Reaching somewhat beneath the base 34, the sides of the triangle 27 will serve as stops 35 and 36 for the swinging movements of the drawbar 25 in the horizontal plane.

As will be seen from the drawings, the triangle 27 has a rail 37 for a roller 28 to roll along, said roller being included in a shackle for the fixation of the chain 26. The roller 28 is thus capable of moving along the rail 37 in dependence on the swinging movements of the drawbar 25 in the horizontal plane, whereby a smooth power transmission is obtained. The movement of the roller 28 along the rail 37 is delimited by the stops 38 and 39.

The drawbar 25 is adjustable in length. Furthermore, it is provided with a row of fixation holes 40 for the chain 26 so that the latter can be mounted on the drawbar 25 at the point most suitable in respect of wheel dimensions etc.

At its end the heavy beam 31 is provided with slidably mounted members 41 and 42 to adapt the beam 31 to implements 3 of different widths. The sliding movement of said members is made possible by clamps 43 which are secured only to the beam 31, thus constituting guides for the members 41 and 42. Keys 44 serve as locking means for said members 41 and 42 and are inserted in holes therein.

As will appear from the drawing, some of the chains 32 are attached to the beam 31 and some of said chains to the members 41 and 42.

In the preferred embodiment illustrated in FIG. 6 both the beam 31 and the members 41 and 42 are constituted by railway rails, those rail portions which form the members 41 and 42 bearing with their foot portions against the foot portions of the rail forming the beam 31.

While some preferred embodiments have been described and shown here, it will be understood that the invention is not limited precisely to these embodiments and that modifications may be resorted to within the scope of the invention such as it is defined in the appendant claims. The structural elements described can therefore be replaced by their equivalents.

What we claim and desire to secure by Letters Patent is:

1. The combination with a tractor having a vertically adjustable three element implement hitch linkage, power operated means for raising, lowering and supporting the hitch linkage, control means for said power operated means including a spring loaded member connected with one of the elements of the hitch linkage to measure the draft load imposed on the tractor by a trailed implement and to initiate raising or lowering of the linkage to maintain the load substantially uniform, and manually operable means for adjusting the control means to determine the load to be maintained on the hitch linkage; of means for coupling a trailed appliance to the tractor in a manner effective to transfer a part of the weight of the appliance to the tractor to increase its traction, said coupling means comprising a frame secured to the hitch linkage, a drawbar connected between the appliance and the tractor independently of said frame effective to transmit draft force from the tractor to the appliance while allowing the appliance to swing relative to the tractor in vertical and horizontal planes, and means connecting said drawbar to said frame effective to transmit a lifting force from the hitch linkage to the appliance and for actuating the draft responsive control means on the tractor so as to maintain the lifting force substantially constant.

2. Tractor-appliance coupling means as defined in claim 1 in which the drawbar is connected to the tractor by a draw hook located beneath the rear axle of the tractor and in which the drawbar is connected with the frame by a flexible tension member.

3. Tractor-appliance coupling means as defined in claim 2 in which the drawbar is so constructed to provide means for connection of the tension member at any one of a series of points spaced apart longitudinally of the drawbar.

4. Tractor-appliance coupling means as defined in claim 1 in which the end of the drawbar remote from the tractor is provided with a rigid cross-piece equipped with means for connection with the trailed appliance.

5. A tractor-appliance coupling means as defined in claim 4 in which a heavy beam is attached to the cross-piece of the drawbar.

6. Tractor-appliance coupling means as defined in claim 1 in which the drawbar and the flexible tension member comprise chains.

7. Tractor-appliance coupling means as defined in claim 6 in which a transversely disposed heavy beam is connected to the drawbar chain substantially at the point of connection of the tension member chain.

8. Tractor-appliance coupling means as defined in claim 1 in which the end of the drawbar remote from the tractor carries a transversely disposed heavy beam effective to apply additional loading to the tractor through the tension member.

9. Tractor-appliance coupling means as defined in claim 1 in which the frame is triangular and is provided with means for connecting its apex with the element of the hitch linkages connected with the spring loaded member and for connecting opposite ends of its base with the other elements of the hitch linkage.

10. Tractor-appliance coupling as defined in claim 9 in which said base of said frame is mounted transversely of said drawbar and positioned for downward movement against and to bear upon said drawbar upon the tilting of the tractor relative to the trailed appliance, whereby further tilting of the tractor is inhibited.

11. Tractor-appliance coupling means as defined in claim 10 in which the side members of the frame extend substantially below the base member to serve as stops for limiting the horizontal swinging of the drawbar.

12. Tractor-appliance coupling means as defined in claim 1 in which the connection between the tension member and the frame is effected through the medium of a roller secured to said means connecting said drawbar to said frame and engaging a horizontally disposed rail carried by the frame.

References Cited in the file of this patent

UNITED STATES PATENTS

| | | |
|---|---|---|
| 1,929,804 | Brown | Oct. 10, 1933 |
| 2,437,875 | Chambers et al. | Mar. 16, 1948 |
| 2,480,387 | Smith | Aug. 30, 1949 |
| 2,900,030 | Edman | Aug. 18, 1959 |
| 2,926,931 | Crampton et al. | Mar. 1, 1960 |